(12) United States Patent
Zhao et al.

(10) Patent No.: US 12,496,131 B2
(45) Date of Patent: Dec. 16, 2025

(54) TRANS-ORAL SURGERY DEVICE COMPRISING A BLADE WITH A DISTAL SCAFFOLD AND A SUPPORT ADJUSTABLE THROUGH TENDONS

(71) Applicant: IMPERIAL COLLEGE OF SCIENCE, TECHNOLOGY AND MEDICINE, London (GB)

(72) Inventors: Ming Zhao, London (GB); Daniel Elson, London (GB); George Mylonas, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 902 days.

(21) Appl. No.: 17/426,438

(22) PCT Filed: Jan. 28, 2020

(86) PCT No.: PCT/GB2020/050187
§ 371 (c)(1),
(2) Date: Jul. 28, 2021

(87) PCT Pub. No.: WO2020/157478
PCT Pub. Date: Aug. 6, 2020

(65) Prior Publication Data
US 2022/0104877 A1   Apr. 7, 2022

(30) Foreign Application Priority Data

Jan. 28, 2019 (GB) .................................... 1901147

(51) Int. Cl.
*A61B 18/22* (2006.01)
*A61B 34/30* (2016.01)
(Continued)

(52) U.S. Cl.
CPC .............. *A61B 18/22* (2013.01); *A61B 34/30* (2016.02); *A61B 2018/00184* (2013.01);
(Continued)

(58) Field of Classification Search
CPC .................... A61B 18/22; A61B 34/30; A61B 2018/00184; A61B 2018/00327;
(Continued)

(56) References Cited

U.S. PATENT DOCUMENTS

| 6,878,106 B1 | 4/2005 | Herrmann |
| 2008/0188890 A1* | 8/2008 | Weitzner ............ A61B 1/00154 |
| | | 606/205 |

(Continued)

FOREIGN PATENT DOCUMENTS

WO    2014110218 A1    7/2014

OTHER PUBLICATIONS

Search Report issued in Application No. GB1901147.7 dated Jul. 10, 2019; 5 pages.
(Continued)

*Primary Examiner* — Paula J Stice
(74) *Attorney, Agent, or Firm* — Wegman Hessler Valore (57) ABSTRACT

A trans-oral surgery device has a scaffold insertable into the vicinity of the larynx or hypopharynx of a subject. A support is arranged for holding a flexible optical fiber for delivering light to the subject. A plurality of tendons is connected to the support, and slidably anchors the support to the scaffold. The tendons are adjustable to move the support relative to the scaffold. The scaffold is provided at the front end of a blade, and the blade is non-straight.

15 Claims, 8 Drawing Sheets

(51) Int. Cl.
*A61B 18/00* (2006.01)
*A61B 18/20* (2006.01)

(52) U.S. Cl.
CPC ............ *A61B 2018/00327* (2013.01); *A61B 2018/00577* (2013.01); *A61B 2018/00589* (2013.01); *A61B 2018/00601* (2013.01); *A61B 2018/00625* (2013.01); *A61B 2018/00982* (2013.01); *A61B 2018/20353* (2017.05); *A61B 2018/20355* (2017.05); *A61B 2018/20359* (2017.05); *A61B 2018/20361* (2017.05); *A61B 2034/301* (2016.02)

(58) Field of Classification Search
CPC .......... A61B 2018/00577; A61B 2018/00589; A61B 2018/00625; A61B 2018/00982; A61B 2018/20353; A61B 2018/20355; A61B 2018/20359; A61B 2018/20361; A61B 2034/301; A61B 2018/00601; A61B 34/71; A61B 2018/00642; A61B 1/0014; A61B 1/267
USPC .......................................................... 606/15
See application file for complete search history.

(56) References Cited

U.S. PATENT DOCUMENTS

| | | | |
|---|---|---|---|
| 2009/0248041 A1* | 10/2009 | Williams | A61B 18/22 606/130 |
| 2009/0264708 A1* | 10/2009 | Pacey | A61B 1/00103 600/187 |
| 2010/0298644 A1 | 11/2010 | Kleene | |
| 2012/0065470 A1 | 3/2012 | Olds et al. | |
| 2013/0310650 A1* | 11/2013 | Hales | A61B 1/267 600/196 |
| 2014/0222021 A1* | 8/2014 | Diolaiti | A61B 34/37 606/130 |
| 2017/0135566 A1 | 5/2017 | Gerrans | |
| 2017/0251905 A1 | 9/2017 | Durant | |
| 2021/0052154 A1* | 2/2021 | Gruteser | A61B 1/32 |

OTHER PUBLICATIONS

International Search Report and Written Opinion issued for International Application No. PCT/GB2020/050187 dated Apr. 9, 2020; 7 pages.

\* cited by examiner

TRANS-ORAL SURGERY DEVICE COMPRISING A BLADE WITH A DISTAL SCAFFOLD AND A SUPPORT ADJUSTABLE THROUGH TENDONS

CROSS REFERENCE TO RELATED APPLICATIONS

This application is a national phase of International Patent Application No. PCT/GB2020/050187 filed Jan. 28, 2020, which claims the priority filing benefit of Great Britain Patent Application No. 1901147.7 filed Jan. 28, 2019, which are incorporated herein by reference in their entireties.

The present application relates to a surgery device, in particular for trans-oral surgery, and preferably trans-oral laser surgery.

Trans-oral laser surgery (or microsurgery) is a commonly used method in which light from a laser is used to perform vaporization, incision, ablation, or photocoagulation on the hypopharynx and larynx tissues, for example the vocal cord tissue. Two convention techniques are known, referred to as 'far field' and 'near field'.

Figure 1:
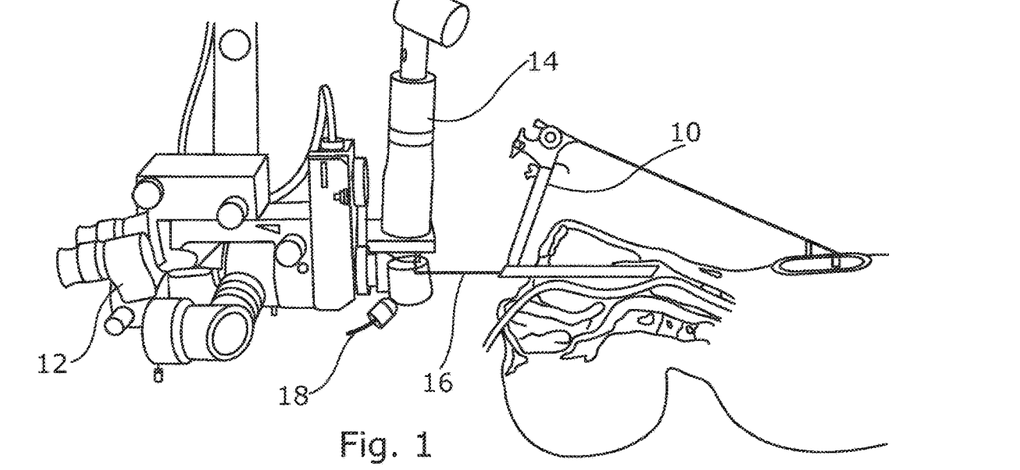
FIG. 1 shows a conventional far field trans-oral laser surgery arrangement.

FIG. 1 shows a conventional far field trans-oral laser surgery set-up. A suspension laryngoscope 10 is used to create a direct and rigid line-of-sight working channel for the laser beam and instruments to access the tissue. A microscope 12 provides the surgeon with a magnified visualization of the operative field. A laser unit 14 directs a laser beam vertically downward onto a mirror that deflects the laser beam 16 to the operative site. The distance between the laser aperture and the target tissue is about 400 mm. A micromanipulator 18 adjusts the mirror to steer the laser beam as required by the surgeon, either under manual control or electronic control. However, this technique can only be performed under direct line-of-sight, which causes problems. These include surgeon fatigue after prolonged operations, poor controllability, and the need for extensive training. Most significantly, the need to maintain direct line-of-sight between the microscope and the operative anatomy induces considerable strain on the cervical vertebrae which can suffer lesions; it can cause damage to the dental arch; and can be accompanied by post-operative pain.

Figure 2:
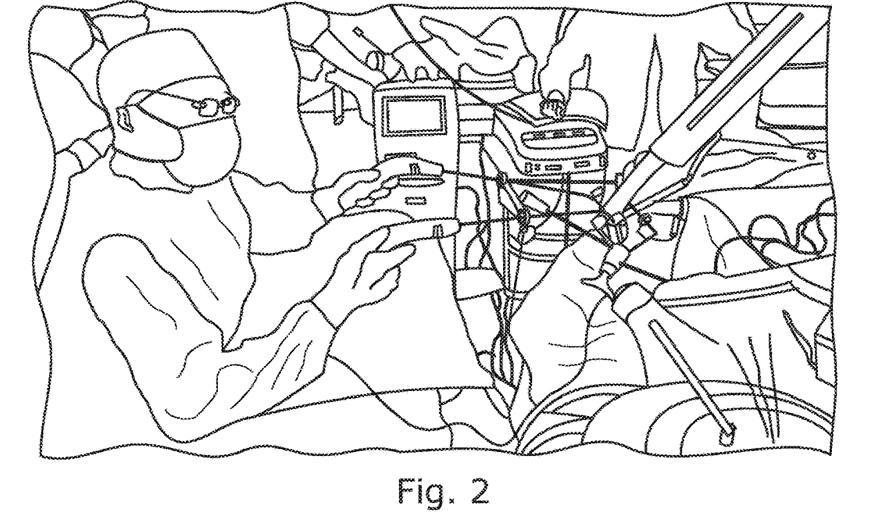
FIG. 2 is an image of a surgeon operating manual manipulators to perform conventional trans-oral surgery.
Figure 3:
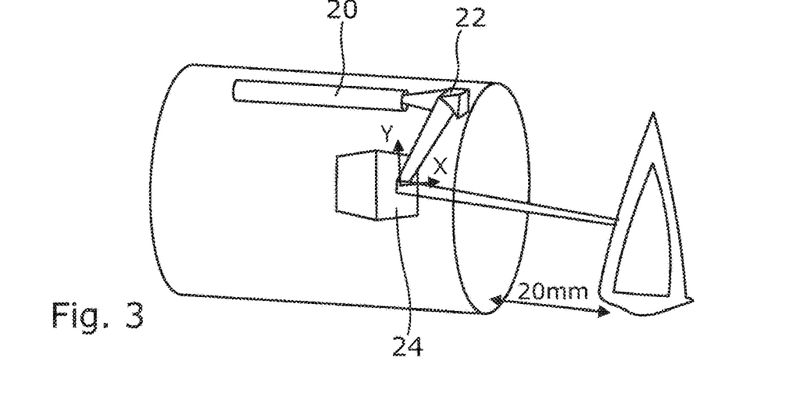
FIG. 3 is a schematic illustration of a conventional laser deflection unit for near field trans-oral laser surgery.

FIG. 2 shows a near field trans-oral surgery in progress. To overcome the straight line-of-sight requirement, a robot-assisted flexible laryngeal scope or flexible robotic surgery system may be used, and the laser light is transmitted via a flexible optical fiber. However, these suffer from problems such as lack of manipulability of the instruments, and the motion performance of the instruments can be of poor accuracy and poor repeatability. A further conventional system uses a micro-fabricated laser deflection mechanism on the distal tip of a semi-flexible endoscope robotic system laryngoscope. Such a laser deflection mechanism is illustrated in FIG. 3 in which laser light emerges from an optical fiber 20 and impinges on a fixed micro-mirror 22 which reflects the light to a steerable mirror 24. The light is then deflected by the steerable mirror 24 towards the target tissue, such as the vocal folds. However, this is near field, so the working distance of the laser beam (from the last mirror to the target tissue) has been decreased to about 20 mm. This means that changing the position at which the beam hits the target tissue significantly affects the angle of incidence of the beam. The maximum angle of incidence to vocal fold tissue for surgery is about 15 degrees from perpendicular. At larger angles there are problems such as: more non-target tissue is removed (tilted cutting), the spot size is enlarged, and the spot shape becomes elliptical. These problems mean that the working area that can be operated on at one time is greatly restricted. In addition, integrating the mechanism into the tip of the scope restricts the available space such that there is not room for other surgical instruments, such as forceps. There are further problems because the micro-mechanism is expensive to fabricate and align; it is difficult to sterilize (or suffers performance degradation due to re-sterilization and reuse), and it has potential electromagnetic compatibility concerns.

The present invention has been devised in view of the above problems.

Accordingly, the present invention provides a trans-oral surgery device comprising:
  a scaffold insertable into the vicinity of the larynx or hypopharynx of a subject;
  a support arranged for holding a flexible optical fiber for delivering light to the subject;
  a plurality of tendons connected to the support and slidably anchoring the support to the scaffold, whereby the tendons are adjustable to move the support relative to the scaffold;
  a blade having a front end and a rear end, wherein the scaffold is provided at the front end of the blade, and the blade is non-straight.

Another aspect of the invention provides a method of performing trans-oral laser surgery using a device according to any preceding claim, comprising inserting the scaffold into the subject using the blade to hold and support the scaffold, operating the tendons to position and orient the support relative to the scaffold, to direct laser light emitted from an optical fiber held by the support to perform trans-oral laser surgery on the hypopharynx or larynx tissues of the subject.

Further aspects of the invention are defined in the dependent claims.

Embodiments of the invention will now be described, by way of example only, with reference to the accompanying drawings in which.

In the drawings, like parts are indicated with like reference signs, and duplicated description thereof is avoided.

Figure 4:
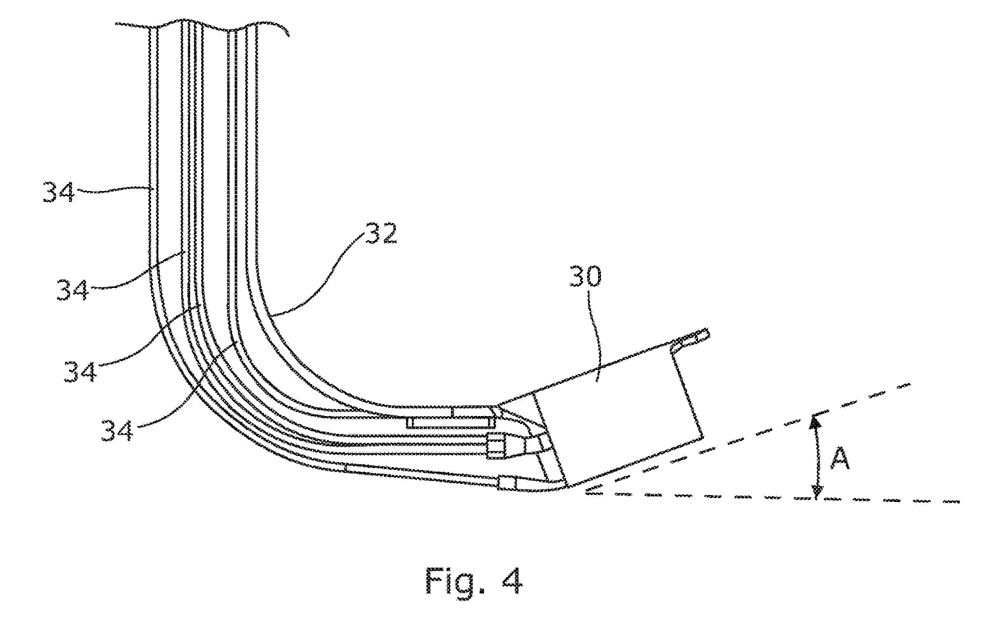
FIG. 4 is a side view of the end portion of a trans-oral surgery device according to an embodiment of the invention.

FIG. 4 shows a trans-oral surgery device according to an embodiment of the invention comprising a scaffold 30 fixed at one end of a curved blade 32. A plurality of cables 34 exit the rear of the scaffold 30 and follow along the line of the blade 32. The scaffold 30 in this embodiment is a generally hollow cylinder, slightly flattened, but could take many different forms, such as a more open structure, provided it can support and accommodate the parts and provide the function discussed below, for example with reference to FIGS. 5 and 6.

The blade 32 is seen side-on in FIG. 4, and is a thin, substantially rigid or semi-rigid strip, curving through approximately 90 degrees (though it does not need to have a smooth continuous curve, but could have a series of discrete angular folds). The blade can be made from any suitable materials, such as biocompatible plastics or steels. In this specific embodiment, the blade is made from a plastics resin. The blade length can be in the range of approximately 100 to 300 mm, the width in the range of from approximately 10 to 20 mm, and the thickness approximately 1 to 2 mm (the thickness and width are not necessarily uniform and can be profiled). The term 'blade' in this context refers to a thin strip, like a blade of grass, and has no connotation of a cutting blade. However, the blade is not limited to a flat strip profile, and could be formed of any suitable rod, lattice, or other structure that resists twisting, fits within the anatomy, and allows clearance for an airway and for the cables 34 (and other wires and fiber). The scaffold 30 and blade 32 can be formed integrally as one piece, for example by 3D-printing, molding, or forming. The axis of the scaffold 30 can be inclined at an angle A with respect to the direction of the end of the blade 32 as shown in FIG. 4. The angle A can be in the range of from 0 to 60 degrees. This can improve access for example to the larynx of a subject (patient, in this case a human). A range of surgery devices embodying the invention can be fabricated with different angles A, and the appropriate one selected depending on the subject's specific anatomical data. Alternatively, an adjustable, lockable hinge connection between the blade 32 and scaffold 30 can be provided, so that a desired angle can be selected.

Figure 5:
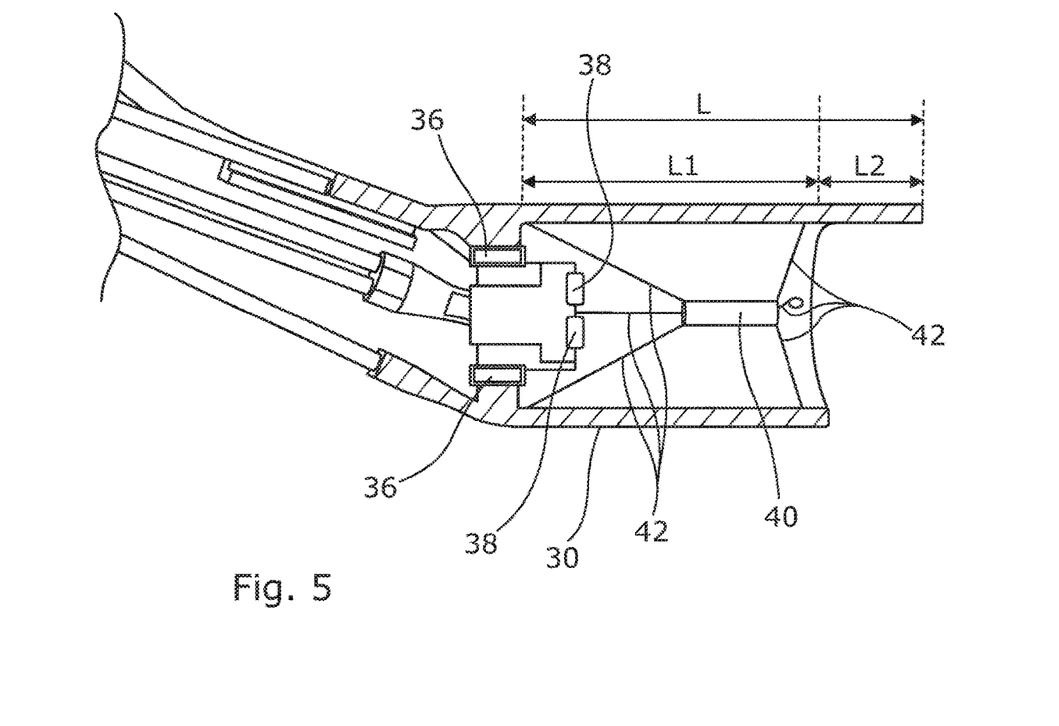
FIG. 5 is an enlarged cross-section of the device of FIG. 4.
Figure 6:
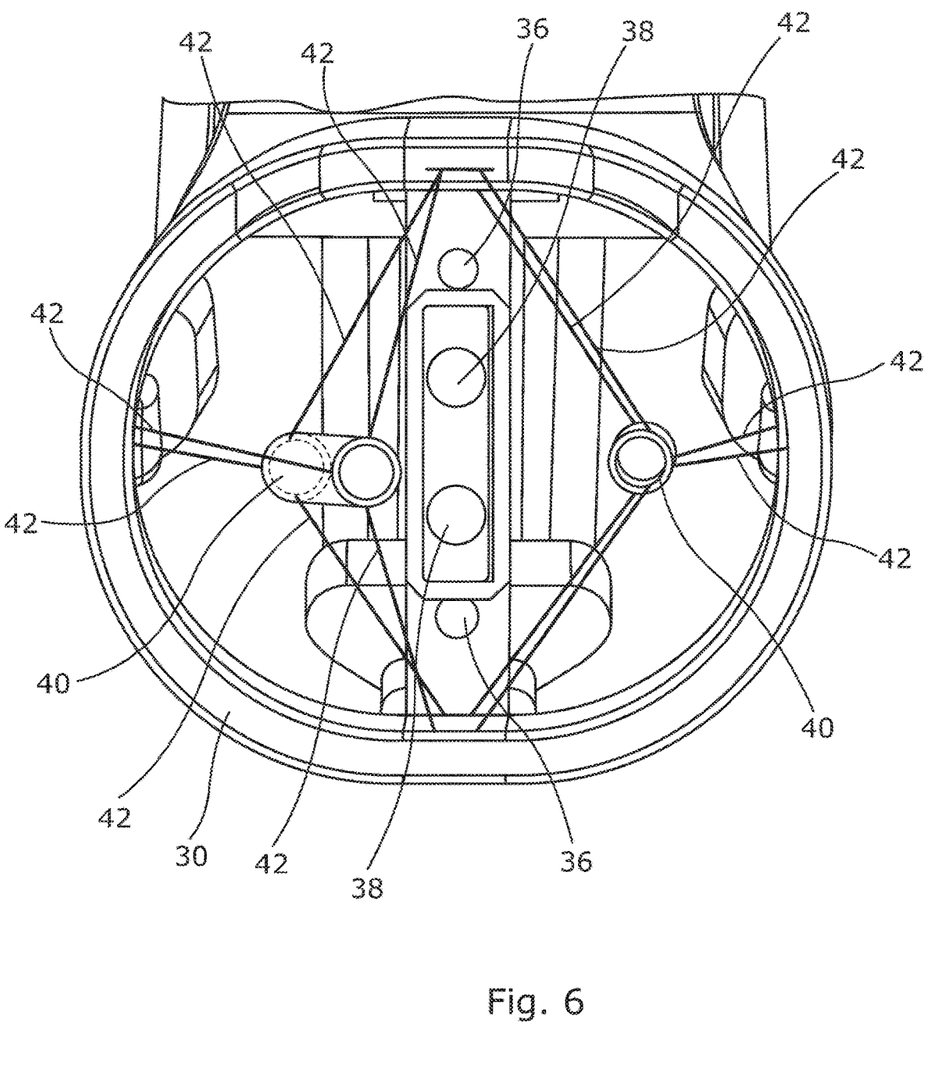
FIG. 6 is an enlarged end-on view of the device of FIG. 4.

FIG. 5 shows the scaffold 30 in cross-section, and FIG. 6 is a front end view of the scaffold 30. In this embodiment, the scaffold 30 comprises a 'barrel' i.e. a hollow, elliptical or circular cylinder. The length L1 of the barrel of the scaffold 30 is in the range of about 15 to 30 mm (such as around 22 mm), and the length L2 of the lip is in the range of about 5 to 10 mm (typically about 5 mm), such that the total length L is in the range of about 20 to 40 mm, such as around 27 mm. As viewed in FIG. 6, the diameter of the scaffold is in the range of about 12 to 30 mm, with in this example the width being about 22 mm and the height being about 20 mm. Again, the dimensions of the scaffold to be used can be selected based on a subject's specific anatomical data.

At the rear end of the scaffold 30, there are two light sources 36, e.g. LEDs, for illuminating the operative area (multiple sources avoid forming shadows). Also at the rear end are two cameras 38 (e.g. CMOS devices; two cameras can be used to provide a stereoscopic view). The light sources 36 and cameras 38 are provided on a strut extending across the rear end of the scaffold; apart from the strut, the rear end of the scaffold is open. Electrical cables pass along the length of the blade 32 to provide external connections to the light sources and cameras. In other embodiments, only one camera need be provided, such as in a low-end version of the device, and two or more cameras in a high-end version of the device. Similarly, the device is not limited to only two light sources widely spaced apart from each other. For example, in another embodiment, a compact ring of light sources can be provided around each camera, and can comprise six of more LED light sources for each camera.

Within the scaffold 30 in this embodiment are two supports 40 (only one is seen in FIG. 5 because it is a cross-section showing only the further half). Each support 40 comprises a small hollow tube. In this embodiment, the diameter of the tube of the support 40 is about 1.5 to 2 mm, and the length is in the range of about 10 to 20 mm. Each support 40 is anchored in place relative to the scaffold 30 by a plurality of tendons 42. The tendons are formed of thin wire. In this embodiment, a set of three tendons 42 are attached toward the front end of each support 40, and a set of three tendons 42 are attached toward the rear end of the support 40. The tendons 42 are slidably attached to the scaffold 30, passing through eyelets (small apertures in the wall of the scaffold) that define entry points into the interior of the scaffold 30. The tendons 42 pass along grooves, channels, and/or bores (not shown) in the wall of the scaffold 30 to reach the rear of the scaffold where they enter sheaths to form cables 34. The cables 34 are in the form of Bowden cables, such that pulling on a tendon 42 at the opposite end from the support 40, transmits the pulling force to the support 40 even along a curved path of the blade 32 that is followed by the cables 34.

Figure 7A:
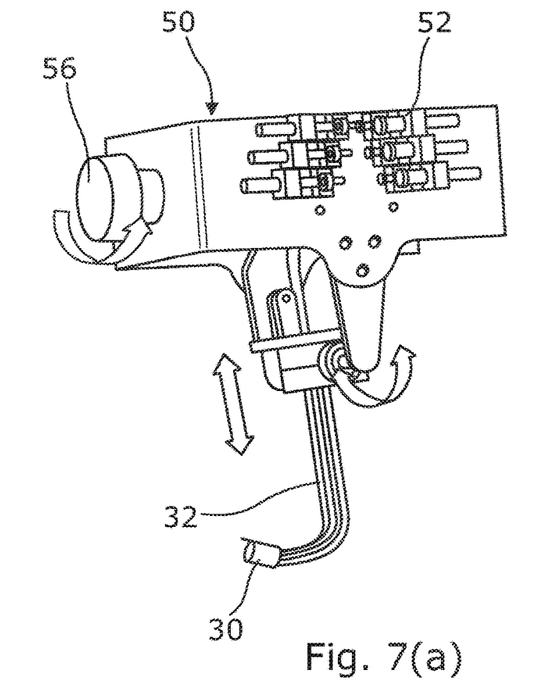
FIGS. 7(a) and 7(b) show an angled view and a front view, respectively, of a trans-oral surgery device according to an embodiment of the invention.
Figure 7B:
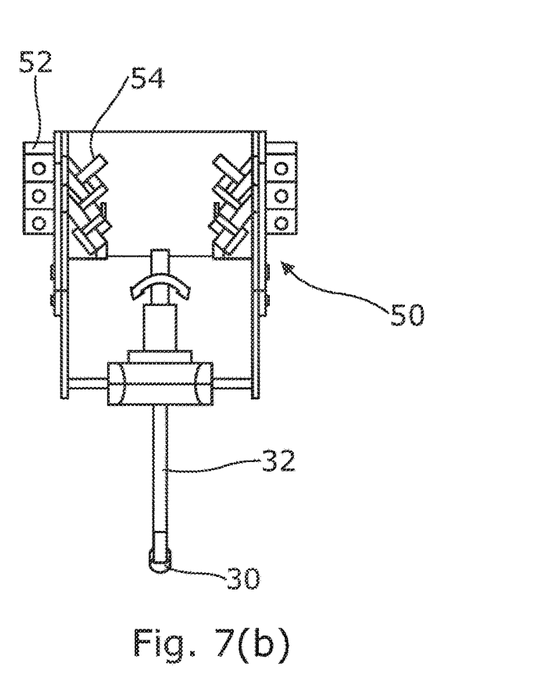
Figure 8:
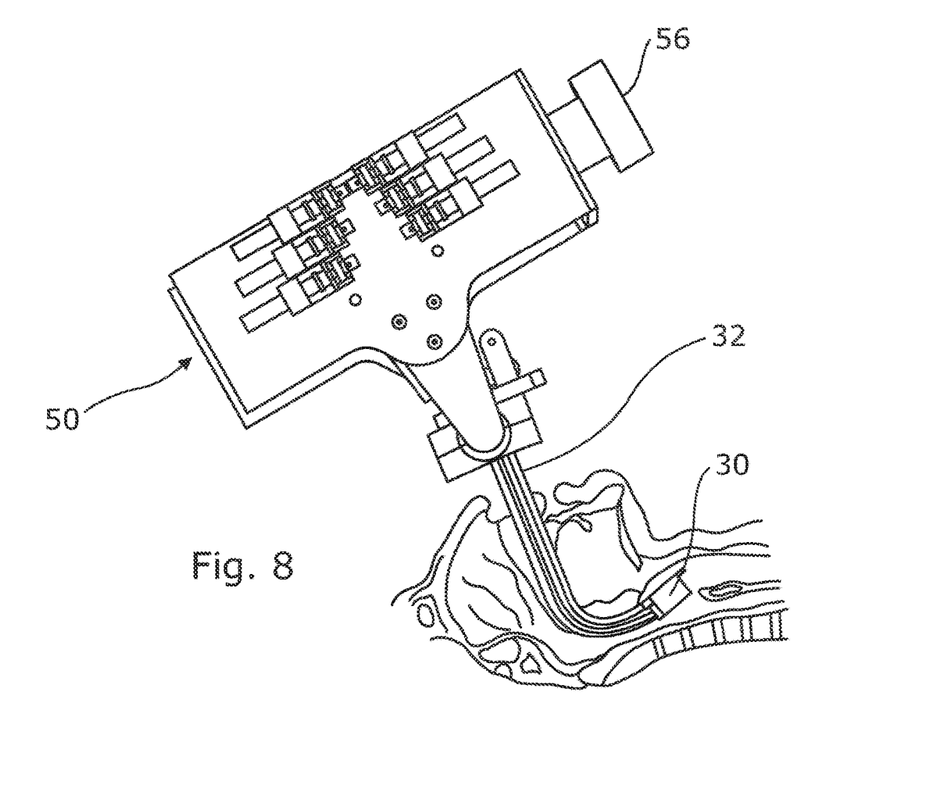
FIG. 8 illustrates the positioning of the device of FIG. 7 in use relative to a cross-section of part of the human anatomy.

FIGS. 7(a) and 7(b) show one embodiment of a surgery device of the invention in which the rear end of the blade 32 (the end furthest from the scaffold 30) is attached to a body 50. The body 50 is in the form of a frame, on the outside of which are disposed motor units 52, one for each tendon, and each motor unit having a spool for receiving a tendon, such that operating the motor unit can wind, unwind and tension the respective tendon. On the inside of the frame are force sensors 54 for sensing the tension in each tendon, and units for terminating the cables carrying the tendons. In use, the body 50 is connected to a support arm (not shown) via an adaptor 56. The support arm holds the surgery device in a fixed position during the surgery, after the scaffold and end of the blade have been inserted within a subject, as shown in FIG. 8. The body 50 and adaptor 56 allow rotation about three axes as shown by the curved arrows (FIGS. 7(a) and 7(b)), and linear extension and retraction of the blade, to enable fine positioning of the scaffold within the subject.

Figures 9A, 9B:
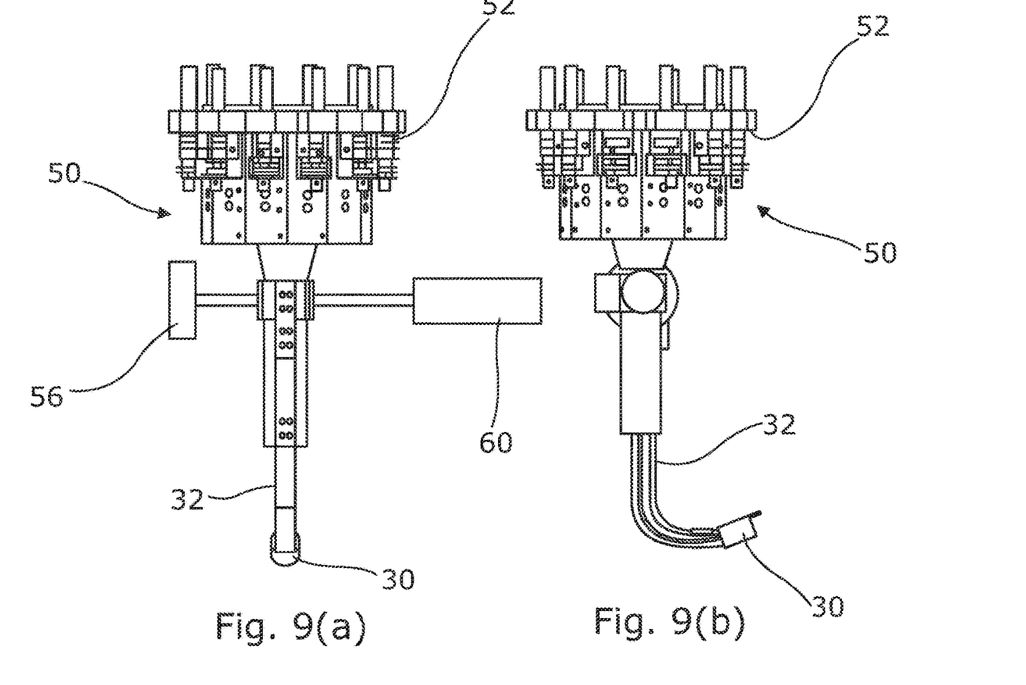
FIGS. 9(a) and 9(b) show a front view and a side view, respectively, of a trans-oral surgery device according to another embodiment of the invention.

FIGS. 9(a) and 9(b) illustrate a different embodiment of the surgery device, having essentially the same components as the embodiment of FIGS. 7 and 8, but with the frame 50 being a closed polygon in cross-section, with the motor units 52 arranged equally around the periphery. This surgery device is rigid and not articulated (apart from rotation about the arm adaptor 56). Positional adjustment is achieved by repositioning the support arm, and a handle 60 is provided.

Figures 10A, 10B:
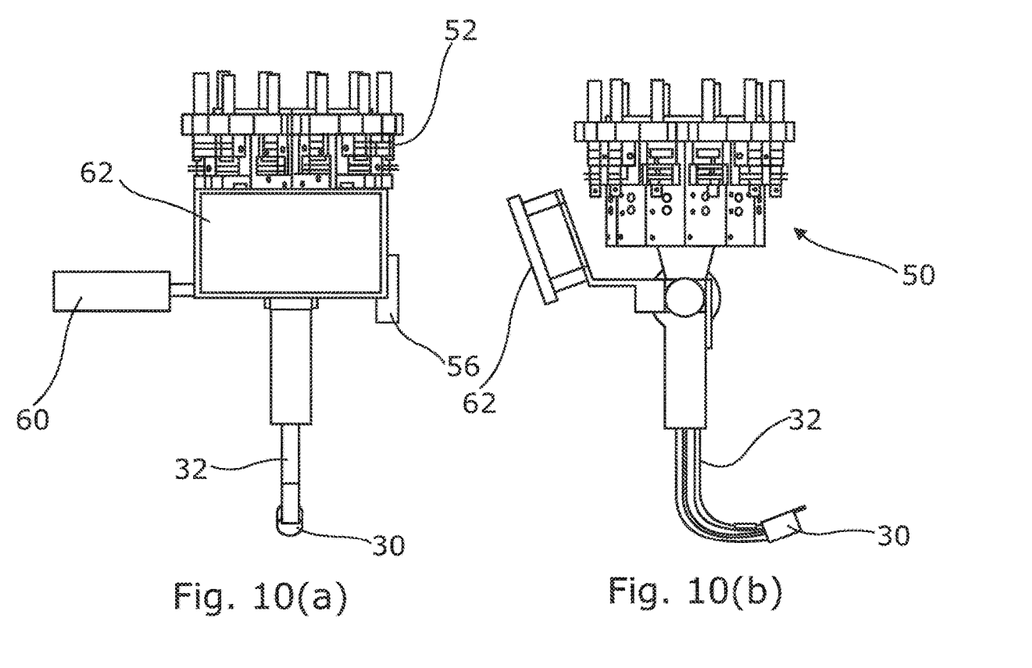
FIGS. 10(a) and 10(b) show a rear view and a side view, respectively, of a trans-oral surgery device according to a further embodiment of the invention.

FIGS. 10(a) and 10(b) show a further variant of the surgery device of FIGS. 9(a) and 9(b) with the addition of a screen 62, such as an LCD screen, for viewing images, for example images obtained from one or both of the cameras 38.

Figure 11:
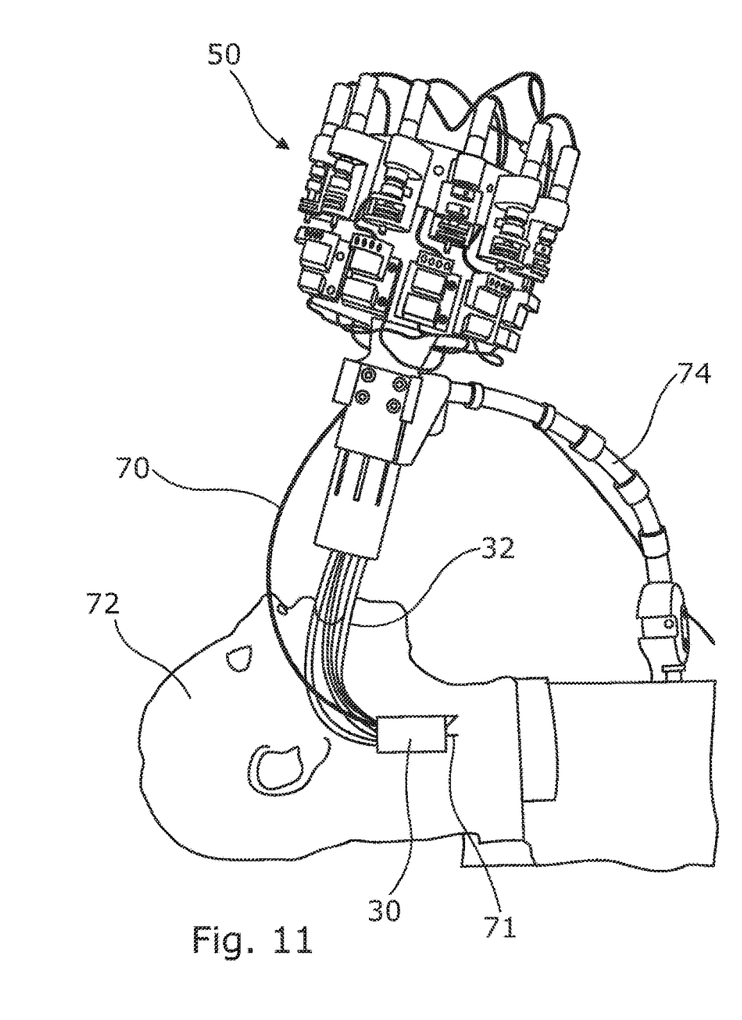
FIG. 11 is a picture of a trans-oral surgery device according to an embodiment of the invention alongside a model subject.
Figure 12:
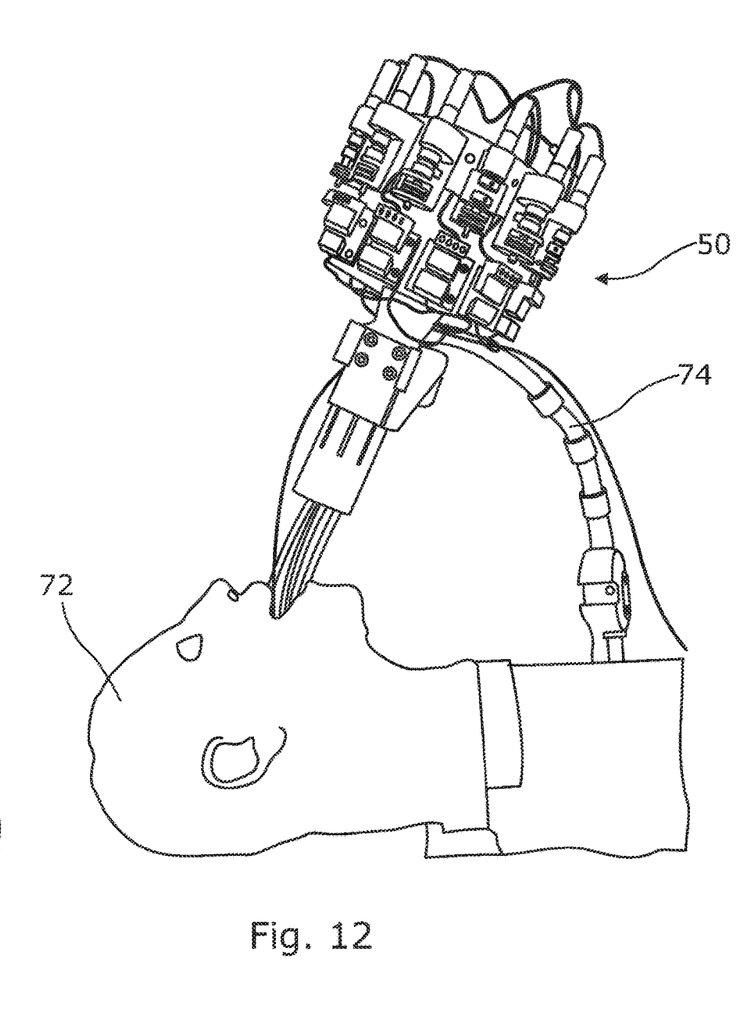
FIG. 12 is a picture of the trans-oral surgery device of FIG. 11 being used with a model subject.
Figure 13:
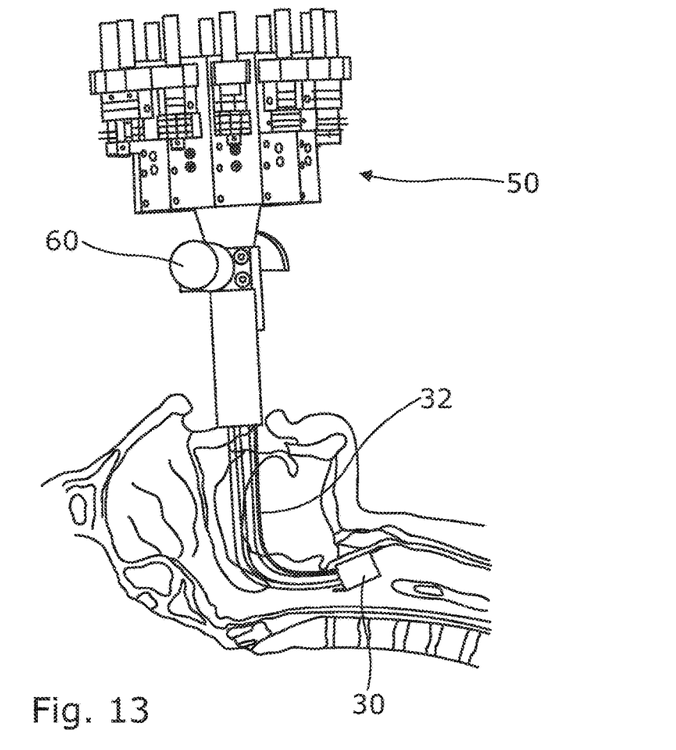
FIG. 13 illustrates the positioning of the device of FIG. 11 in use relative to a cross-section of part of the human anatomy.

FIG. 11 is an image of an embodiment of a surgery device similar to that of FIGS. 9 and 10. FIG. 11 also shows a flexible optical fiber 70 (which can be within a catheter) which is fixed to one of the supports 40 within the scaffold 30. The tip 71 of the optical fiber can be seen at the front of the scaffold 30 approximately level with the upper lip of the scaffold. The other end of the optical fiber 70 can be coupled to a laser source to delivery laser light to the operative area adjacent to the scaffold 30. FIGS. 11 and 12 show the surgery device in relation to the head of a model subject 72. The surgery device is suspended by a flexible, articulated support arm 74 fixed to a table. In FIG. 12, the scaffold 30 and front end of the blade 32 have been insert through the oral cavity of the subject 72. FIG. 13 shows a positioning of a surgery device from FIGS. 9 to 12 within the human anatomy.

Figure 14:
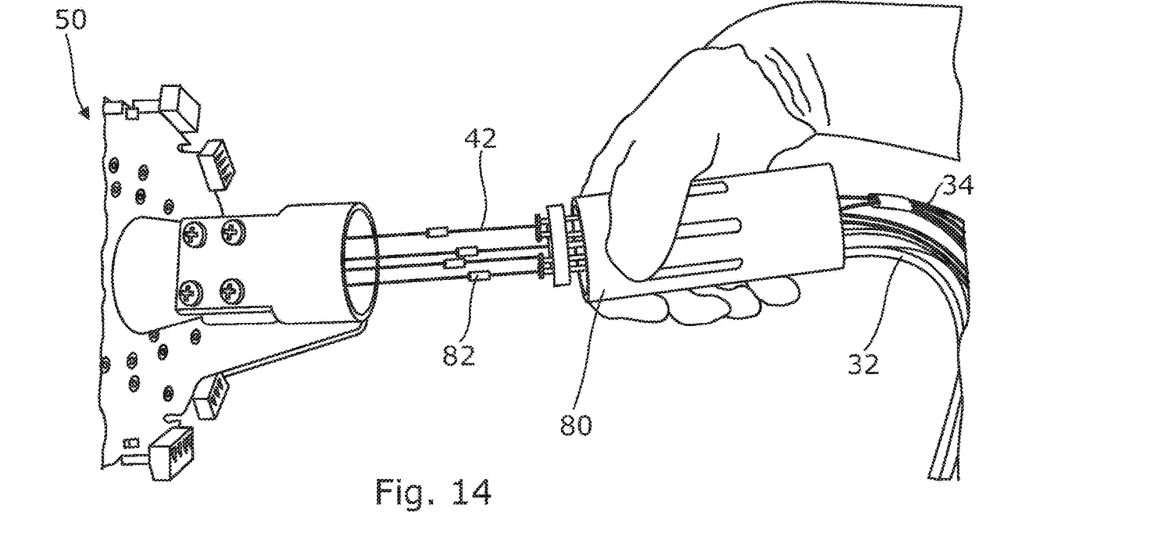
FIG. 14 is an image of the trans-oral surgery device of FIG. 11 partially disassembled.

FIG. 14 shows the connection between the blade 32 and the body 50 disassembled. The blade 32 is fixed to a connection piece 80 in which the cables 34 terminate, but the tendons 42 continue. In use the connection piece 80 is attached to the body 50. The tendons 42 pass into the body 50 and onto the spools of the motor units. However, tendon connectors 82 are provided such that the tendons are separable. The tendon connectors 82 can be in the form of threaded screw connectors, hooks, clasps, or any other suitable form. By undoing the tendon connectors 82, the blade 32 and associated scaffold assembly can be completely detached from the body 50. This facilitates the separate sterilization of the blade and scaffold assembly. The tendons can then be reconnected and the blade and scaffold assembly can then be conveniently reattached to the body 50 without having to completely rewind the tendons to all of the motor units. Alternatively, some or all of the blade and scaffold assembly can be single-use items that are replaced by a new one which is then reassembled and connected to the body.

In one embodiment of the invention, the tendons 42 comprise ultra-high-molecular-weight polyethylene (UHMW-PE). Such cables are extremely stiff for their cross-sectional area and are not prone to fatigue. The tendons can be approximately 0.1 to 0.3 mm in diameter, such as 0.19 mm, and rated for breaking at a load of at least 100 N, such as approximately 130 N. The Bowden cables can be lined with PTFE tubing to minimize friction between the tendons and the sheath of the cable. The tendons can be accurately fixed to the support by glue. Each motor unit 52 can comprise a brushless DC motor and a spool for the tendon with a diameter such as 6 mm. Each force sensor 54 can be in the form of a load cell.

The operation of the surgery device will now be explained. The tendons 42 are used to position and orient a support 40, as previously mentioned with reference to FIG. 5. The combination of the position and orientation is also referred to as the 'pose' of the support 40. Adjusting the position and/or orientation (i.e. pose) is also simply referred to as moving the support relative to the scaffold.

To calibrate the tendons 42 for controlling a support 40, one tendon is pulled (by operating its respective motor unit to wind it onto its spool), while the other tendons are essentially slack. When increased resistance to further winding is sensed by the force sensor for that one tendon, it is known that the attachment point of the tendon to the support is pulled fully toward the entry point of the tendon into the scaffold 30. This provides a datum, such that when the motor (which is a servo motor) is unwound, it is known (from the amount of rotation and size of the spool) how much tendon has been released, so that the distance from the entry point to the attachment point of the tendon to the support 40 is always precisely known. This process is repeated for each tendon in turn.

By subsequently winding the motor units and suitably tensioning all the tendons, the spatial position and angular orientation of the support 40 is uniquely defined in 3D relative to the scaffold. A control unit (not shown, but which may be a computer running software) can compute the position and orientation of the support 40, using triangulation and trigonometry, knowing the lengths of the tendons unwound from the datum calibration positions. The control unit can also drive the motor units to reposition the support to a required position and orientation. An optical fiber is fixed to the support 40 (with the position of the tip of the fiber known relative to the support), so knowing the position and orientation of the support also defines the position and orientation of the tip of the fiber.

Figure 15:
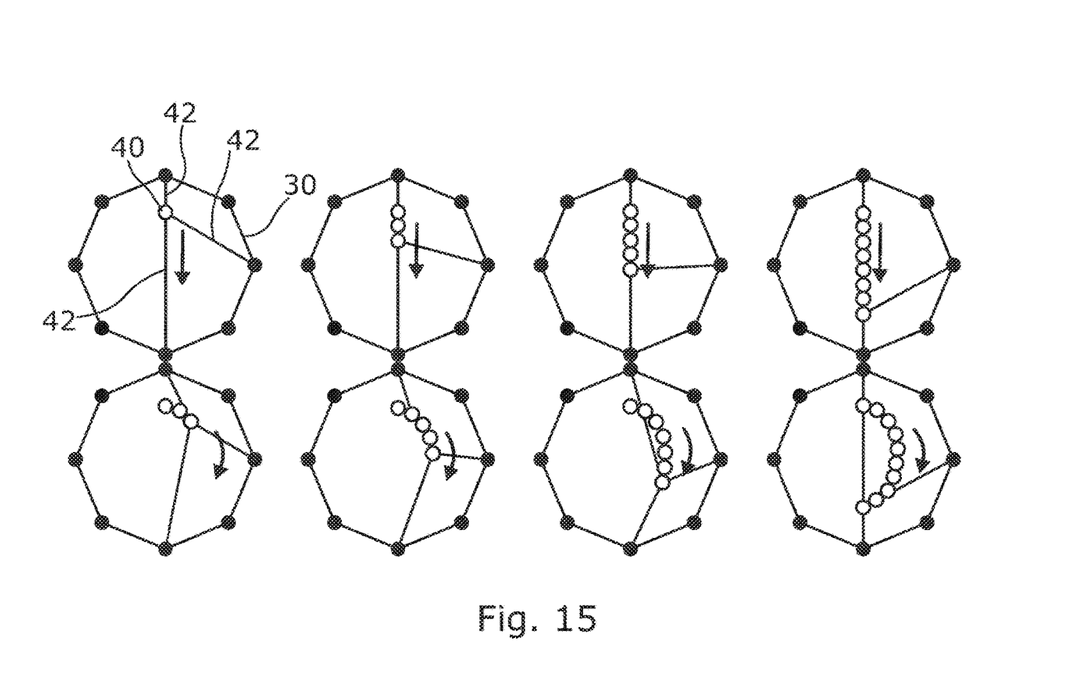
FIG. 15 is a sequence of schematic illustrations of using tendons to control the path of a laser spot in a trans-oral surgery device according to an embodiment of the invention.

FIG. 15 shows a schematic representation of a scaffold 30, with the end of a support 40 attached by three tendons 42. In this example, the entry points of two of the tendons 42 from the scaffold 30 are diametrically opposite each other, at the top and bottom, and the third entry point is at the side. The top row of diagrams of FIG. 15 illustrates that, by adjusting the lengths of the tendons 42, the end of the support 40 can be made to describe a linear path (indicated by the straight arrow). The bottom row of diagrams of FIG. 15 illustrates that, by suitably adjusting the lengths of the tendons 42, the end of the support 40 can be made to describe an arcuate path (indicated by the curved arrow). Other shapes of path are possible, such as circular or other trajectories, or freely defined paths. A number of paths can be pre-programmed into the control unit to perform autonomously, or can be manually controlled (but whereby the shape of path indicated by a surgeon using, for example, a joystick, is automatically converted into appropriate drive signals for the motor units by the control unit). An incision path can be defined by the surgeon and stored in the control unit, and then the device can perform the actual incision along the path autonomously, using laser light, from the stored information. In this way, high accuracy, repeatability, and uniform velocity of motion of the laser beam path can be achieved.

FIG. 15 only shows one end of the support 40; there are of course tendons at the other end to further control the position and orientation of the support, and hence the direction of a laser beam emitted from an optical fiber fixed to the support.

In use, with the surgery device positioned with the scaffold adjacent to the hypopharynx or larynx, an aiming beam of visible light is emitted from the tip of the optical fiber so that the surgeon can see the point where it impinges on the anatomy. The aim of the light beam can be moved by manual or automated control. When in a desired position, the surgical laser light is passed through the optical fiber and emitted from the tip to impinge on the tissue. The term 'light' used herein is not restricted to visible light, but can include, for example, infra-red and ultra-violet light. The surgical laser light can be pulsed. The aiming beam can be a low power level setting of the surgical light, or the aiming beam can be provided by a completely different source from the surgical laser light (such as the aiming beam being a visible wavelength of light and the surgical laser light being infra-red). The surgical laser light can be provided from a suitable laser source such as a gas laser or a solid state laser, and examples include a CO$_2$ laser, thulium laser, potassium titanyl phosphate (KTP) laser, blue laser, and so forth.

In more detail, in one embodiment of the invention, the size and shape of a laser scan pattern are pre-programmed, and a joystick is used to set the center of the scanning pattern and change its direction. With conventional apparatus, an arbitrary free scan pattern is not allowed, and therefore many small-scaled scan patterns are required to dissect irregular pathological margins. This leads to increased procedural time and some loss of accuracy, thereby compromising the advantages of the free beam delivery technique. An improved approach for describing and executing a free scan path is as follows: the implementation is a master-slave controller in which by using control points, an autonomous path can be determined. The master manipulator (such as a joystick) is used to determine and select desired control points in the workspace, which are then used to generate the final path and perform the path scan automatically. The ideal pose of the fiber tip is normal to the target tissue, which results to a circular spot shape of the aiming beam. The operator can choose the proper pose based on the apparent spot shape. The control points include a starting point, an endpoint, and roughly equidistant 'via' points to sparsely describe the desired trajectory.

The pose of the support is recorded for all control points, and the sequentially saved points serve as the input data to generate the entire scan path (x, y, z, yaw, pitch), for example using the Catmull-Rom spline interpolation. The control unit then executes the continuous generated path. An inverse dynamics PD (proportional-derivative) control algorithm with tension optimization is performed. The control is based on a PD tension control routine. Inverse Kinematics is used to transform the desired position in the support pose space to a desired rotation in the motor joint space. The Jacobian which describes this transformation can be used in combination with the static equilibrium equations of all the tendon force-vectors to numerically calculate the optimal tension distribution. By only allowing solutions which are within bounds—i.e. a positive tension to prevent tendon slackness and within a maximum limit to prevent tendon failure—the support remains controllable within its workspace. Friction can also be minimized by reducing tendon tensions by the control routine. The above method calculates the desired tendon tension, which is compared to the measured tendon tension. The error between the desired and measured tendon tension is multiplied by a proportional gain to control the rotation of each motor. The parameters of the PD controller and the tension gain are determined heuristically.

As can be seen in FIG. 15, in this embodiment, the end of the support can be moved to any position within a triangle in the right-hand side of the scaffold as viewed in the Figure. This is so that another support can be provided in the left-hand side of the scaffold (as shown in FIG. 6). However, embodiments of the invention are not limited to this arrangement. For example, more than three tendons can be provided, such as four at the front of the support and four at the rear of the support. The points of entry of the tendons can also be arranged to define different regions for the support or supports.

Figure 16:
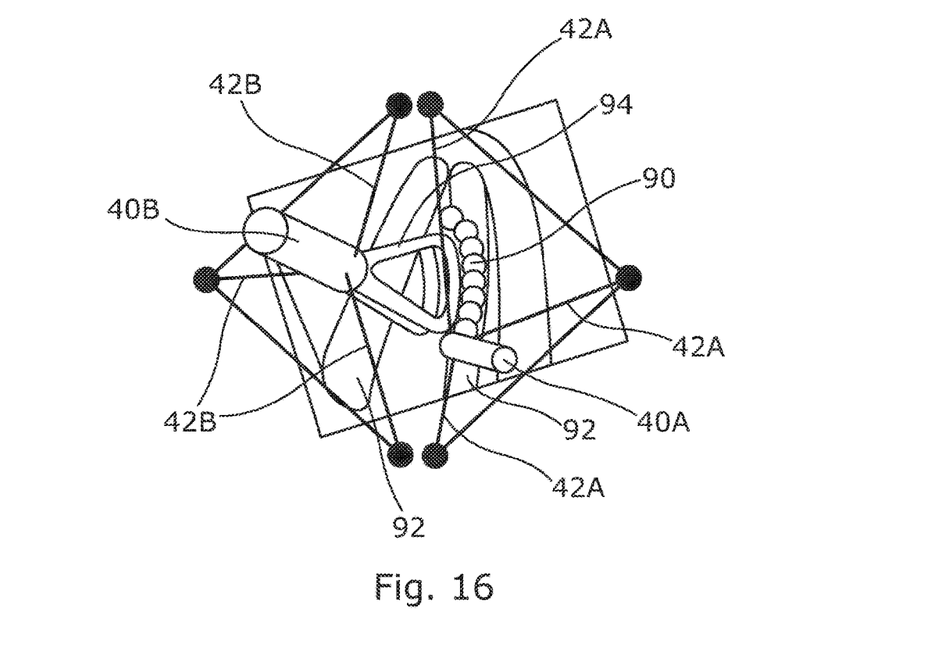
FIG. 16 is a schematic illustration of a trans-oral surgery device according to an embodiment of the invention in use.

FIG. 16 illustrates schematically an embodiment of the invention in use. On the right-hand side is a support 40A carrying an optical fiber, and controlled by tendons 42A to define a path 90 (indicated by a row of spots) for a laser beam emitted from the optical fiber onto a vocal cord 92 of a subject. On the left-hand side, a support 40B, held by tendons 42B, carries forceps 94 that grasp the piece of vocal cord tissue that is being excised. Forceps is merely one example of a surgical instrument or tool that can be provided with embodiments of the invention. Additional tendons or manipulators can be provided to operate the surgical tool or tools externally, for example to axially rotate the tool or to open and close forceps or grippers.

The invention claimed is:

1. A trans-oral surgery device comprising:
   a scaffold insertable into a vicinity of a larynx or hypopharynx of a subject;
   a support arranged for holding a flexible optical fiber for delivering light to the subject,
   wherein the support is housed within the scaffold;
   a plurality of tendons connected to the support and slidably anchoring the support to the scaffold, whereby the tendons are adjustable to move the support relative to the scaffold;
   a blade having a front end and a rear end, wherein the scaffold is provided at the front end of the blade, and the blade is non-straight, and
   wherein each of the tendons connects the support to the scaffold along a different direction respective to each of the other tendons, such that each of the tendons is adjustable to move the support in a different direction relative to the scaffold respective to each of the other tendons, and
   wherein the plurality of tendons slidably anchoring the support to the scaffold comprises a first set of tendons connected to the support toward a front end of the support, and a second set of tendons connected to the support toward a rear end of the support, and wherein the first set of tendons and the second set of tendons directly contact the scaffold.

2. The device according to claim 1, wherein each of the tendons is provided with a motor and a force sensor.

3. The device according to claim 2, further comprising a body connected to the rear end of the blade, wherein the body is provided with the motor and the force sensor for each of the tendons, and wherein each of the tendons passes from the scaffold to the rear end of the blade within a sheath in the form of a Bowden cable.

4. The device according to claim 3, wherein each tendon is reversibly separable such that the body can be detached from the blade and scaffold.

5. The device according to claim 1 wherein the first set of tendons and the second set of tendons each comprises at least three tendons.

6. The device according to claim 1, wherein the blade is curved.

7. The device according to claim 1, further comprising a control unit for adjusting the tendons to move the support under manual control and/or under automated control.

8. The device according to claim 1, further comprising at least one light source and at least one camera provided at the scaffold.

9. The device according to claim 1, wherein the support comprises a hollow tube.

10. The device according to claim 1, further comprising a flexible optical fiber held by the support, for steerably delivering laser light for trans-oral laser surgery on the subject.

11. The device according to claim 1, further comprising a second support arranged for holding a surgical instrument, the second support being connected to a further plurality of the tendons, whereby the further plurality of the tendons is adjustable to move the second support relative to the scaffold.

12. The device according to claim 1, wherein, in use during trans-oral surgery, the rear end of the blade remains outside the subject.

13. A method of performing trans-oral laser surgery, comprising:
   providing a trans-oral surgery device comprising:
      a scaffold insertable into a vicinity of a larynx or hypopharynx of a subject;
      a support arranged for holding a flexible optical fiber for delivering light to the subject, wherein the support is housed within the scaffold;
      a plurality of tendons connected to the support and slidably anchoring the support to the scaffold, whereby the tendons are adjustable to move the support relative to the scaffold, and
      wherein each of the tendons connects the support to the scaffold along a different direction respective to each of the other tendons, such that each of the tendons is adjustable to move the support in a different direction relative to the scaffold respective to each of the other tendons, and
      wherein the plurality of the tendons slidably anchoring the support to the scaffold comprises a first set of the tendons connected to the support toward a front end of the support, and a second set of the tendons connected to the support toward a rear end of the support, and wherein the first set of the tendons and the second set of the tendons directly contact the scaffold; and
      a blade having a front end and a rear end, wherein the scaffold is provided at the front end of the blade, and the blade is non-straight;
   inserting the scaffold into the subject using the blade to hold and support the scaffold; and
   operating the tendons to position and orient the support relative to the scaffold, to direct laser light emitted from an optical fiber held by the support to perform trans-oral laser surgery on the hypopharynx or larynx tissues of the subject.

14. The method according to claim 13, further comprising operating the tendons to position and orient the support relative to the scaffold to direct an aiming beam of light at the hypopharynx or larynx tissue to select a plurality of control points;
   computing a trajectory based on the control points; and
   operating the tendons to direct laser light emitted from the optical fiber along the trajectory.

15. The method according to claim 13, wherein the trans-oral laser surgery comprises at least one of incision, excision, and ablation.

* * * * *